(12) United States Patent  
Raniere

(10) Patent No.: US 9,288,341 B2  
(45) Date of Patent: Mar. 15, 2016

(54) CONTINUOUS FILM AND CAMERA AND METHOD THEREOF

(71) Applicant: FIRST PRINCIPLES, INC., Albany, NY (US)

(72) Inventor: Keith A Raniere, Albany, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 0 days.

(21) Appl. No.: 14/710,780

(22) Filed: May 13, 2015

(65) Prior Publication Data

US 2015/0244880 A1 Aug. 27, 2015

Related U.S. Application Data

(62) Division of application No. 14/676,403, filed on Apr. 1, 2015, which is a division of application No. 13/840,897, filed on Mar. 15, 2013, now Pat. No. 9,039,306.

(51) Int. Cl.
  *G03B 19/10* (2006.01)
  *H04N 1/00* (2006.01)
  *G03B 1/00* (2006.01)
  (Continued)

(52) U.S. Cl.
  CPC .......... *H04N 1/00214* (2013.01); *G03B 1/00* (2013.01); *G03B 17/06* (2013.01); *G03B 17/18* (2013.01); *G03B 17/24* (2013.01); *G03B 17/26* (2013.01); *G03B 19/06* (2013.01); *H04N 1/00347* (2013.01); *H04N 1/00668* (2013.01); *H04N 5/23293* (2013.01); *G03B 2206/00* (2013.01);

(Continued)

(58) Field of Classification Search
  USPC .......................... 396/360, 361, 446, 511, 512
  See application file for complete search history.

(56) References Cited

U.S. PATENT DOCUMENTS 2,553,656 A * 5/1951 Kirby ........................... 396/357
2,672,796 A   3/1954 Incledon (Continued)

FOREIGN PATENT DOCUMENTS

| DE | 3510061 A1 | 9/1986 |
| JP | 8304920 A | 11/1996 |
| JP | 2002300453 A | 10/2002 |

OTHER PUBLICATIONS

Office Action for U.S. Appl. No. 14/676,403, mailed on May 22, 2015.

*Primary Examiner* — Clayton E Laballe
*Assistant Examiner* — Warren K Fenwick
(74) *Attorney, Agent, or Firm* — Schmeiser, Olsen & Watts, LLP

(57) ABSTRACT

A method for continuous wireless transmission of image data through radio waves to an outside picture processing device and continuous capture of images on frames of camera film rolls, said method comprising the steps of providing a camera body, providing an image radio wave converter, providing a radio wave transmission attachment mounted on said camera body for transmitting image data though radio waves to outside picture processing device, providing a camera lens mounted on said camera body for capturing images on frames of camera film rolls, providing a plurality of housing compartments for receiving camera film rolls, and providing a plurality of detachable housing compartment doors operable for simultaneous removal of at least one camera film roll in a non-filming position when images are captured on all frames of the at least one camera film roll, without exposing remaining camera film roll in filming position is provided.

7 Claims, 10 Drawing Sheets

(51) Int. Cl.
*G03B 17/18* (2006.01)
*G03B 17/24* (2006.01)
*G03B 19/06* (2006.01)
*G03B 17/06* (2006.01)
*G03B 17/26* (2006.01)
*H04N 5/232* (2006.01)

(52) U.S. Cl.
CPC *H04N 2201/0041* (2013.01); *H04N 2201/0055* (2013.01)

(56) References Cited

U.S. PATENT DOCUMENTS

| | | | |
|---|---|---|---|
| 2,693,137 A | | 11/1954 | Roehrig |
| 2,696,152 A | | 12/1954 | Roehrig |
| 3,058,407 A | | 10/1962 | Schotthoefer |
| 3,185,057 A | * | 5/1965 | Hearon et al. ............. 396/24 |
| 3,286,613 A | * | 11/1966 | Domnick ................. 396/446 |
| 3,563,148 A | * | 2/1971 | Newman .................. 396/397 |
| 3,805,277 A | | 4/1974 | Domnick |
| 4,108,542 A | | 8/1978 | Stemme et al. |
| 4,234,795 A | * | 11/1980 | Muller ..................... 53/284.4 |
| 5,049,910 A | * | 9/1991 | Hsiung ..................... 396/446 |
| 5,357,301 A | | 10/1994 | Prosser |
| 5,387,955 A | * | 2/1995 | Cocca ......................... 396/59 |
| 5,493,352 A | * | 2/1996 | Reddig et al. ............. 396/647 |
| 5,887,207 A | | 3/1999 | Gasper et al. |
| 5,893,654 A | | 4/1999 | Pagano et al. |
| 6,173,119 B1 | * | 1/2001 | Manico et al. ................ 396/6 |
| 9,039,306 B2 | | 5/2015 | Raniere |

* cited by examiner

CONTINUOUS FILM AND CAMERA AND METHOD THEREOF

CROSS-REFERENCE TO RELATED APPLICATIONS

This application is a divisional application claiming priority to U.S. application Ser. No. 14/676,403, filed Apr. 1, 2015, and entitled "Continuous Film and Camera and Method Thereof," which claims priority to U.S. application Ser. No. 13/840,897, filed Mar. 15, 2013, and entitled "Continuous Film and Camera and Method Thereof."

BACKGROUND

Technical Field

The disclosure relates generally to the photography field. In particular, the disclosure relates to cameras with multiple camera film rolls.

Often, an amateur photographer misses opportunities to take photographs when the amateur is removing or changing the film camera rolls. After the amateur takes photographs, the amateur may upload photograph images for printing or send the camera film rolls to a photo processing center. There is a need for a dual camera that allows automatic continuous transmission of image data through radio waves to outside picture processing devices and continuous capture of images on frames of camera film rolls. While one camera film roll is being removed, images may be captured on frames of a second camera film roll in the filming position and a radio wave transmission attachment of the dual camera may transmit image data through radio waves to outside picture processing devices.

SUMMARY

One object of the disclosure is to provide a dual camera for continuous wireless transmission of image data through radio waves to outside picture processing devices and continuous capture of images on frames of camera film rolls, the dual camera comprising: a camera body; an image radio wave converter; a radio wave transmission attachment mounted on the camera body for transmitting image data though radio waves to outside picture processing devices; a camera lens mounted on the camera body for capturing images on frames of camera film rolls; a plurality of housing compartments for receiving camera film rolls; and a plurality of detachable housing compartment doors operable for simultaneous removal of at least one camera film roll in a non-filming position when images are captured on all frames of the at least one camera film roll, without exposing remaining camera film roll in filming position.

It is another object of the disclosure to provide a dual camera for continuous transmission of radio wave image data to outside picture processing devices and continuous capture of images on frames of camera film rolls, the dual camera comprising: a camera body; a cable for transmitting radio wave image data to an outside picture processing device; a camera antenna for receiving electrical signals; a camera lens mounted on the camera body for capturing images on frames of camera film rolls; a plurality of housing compartments for receiving camera film rolls; and a plurality of detachable housing compartment doors operable for simultaneous removal of at least one camera film roll in a non-filming position when images are captured on all frames of at least one camera film roll, without exposing remaining camera film roll in filming position.

In a general aspect, the disclosure provides a method for continuous wireless transmission of image data through radio waves to outside picture processing devices and continuous capture of images on frames of camera film rolls, the method comprising the steps of: providing a camera body; providing a radio wave transmission attachment mounted on the camera body for transmitting image data though radio waves to outside picture processing device; providing a camera lens mounted on the camera body for capturing images on frames of camera film rolls; providing a plurality of housing compartments for receiving camera film rolls; and providing a plurality of detachable housing compartment doors operable for simultaneous removal of at least one camera film roll in a non-filming position when images are captured on all of frames of at least one camera film roll, without exposing remaining camera film roll in filming position.

In a further aspect, the disclosure provides a method for continuous transmission of images through a cable to an outside picture processing device and continuous capture of images on a camera film, the dual camera comprising the steps of: providing a camera body; providing a cable for transmitting images to an outside picture processing device; providing a camera lens mounted on the camera body for capturing images on frames of camera film rolls; providing a plurality of housing compartments for receiving camera film rolls; and providing a plurality of detachable housing compartment doors operable for simultaneous removal of at least one camera film roll in a non-filming position when images are captured on all frames of at least one camera film roll, without exposing remaining camera film roll in filming position.

DETAILED DESCRIPTION

Figure 1:
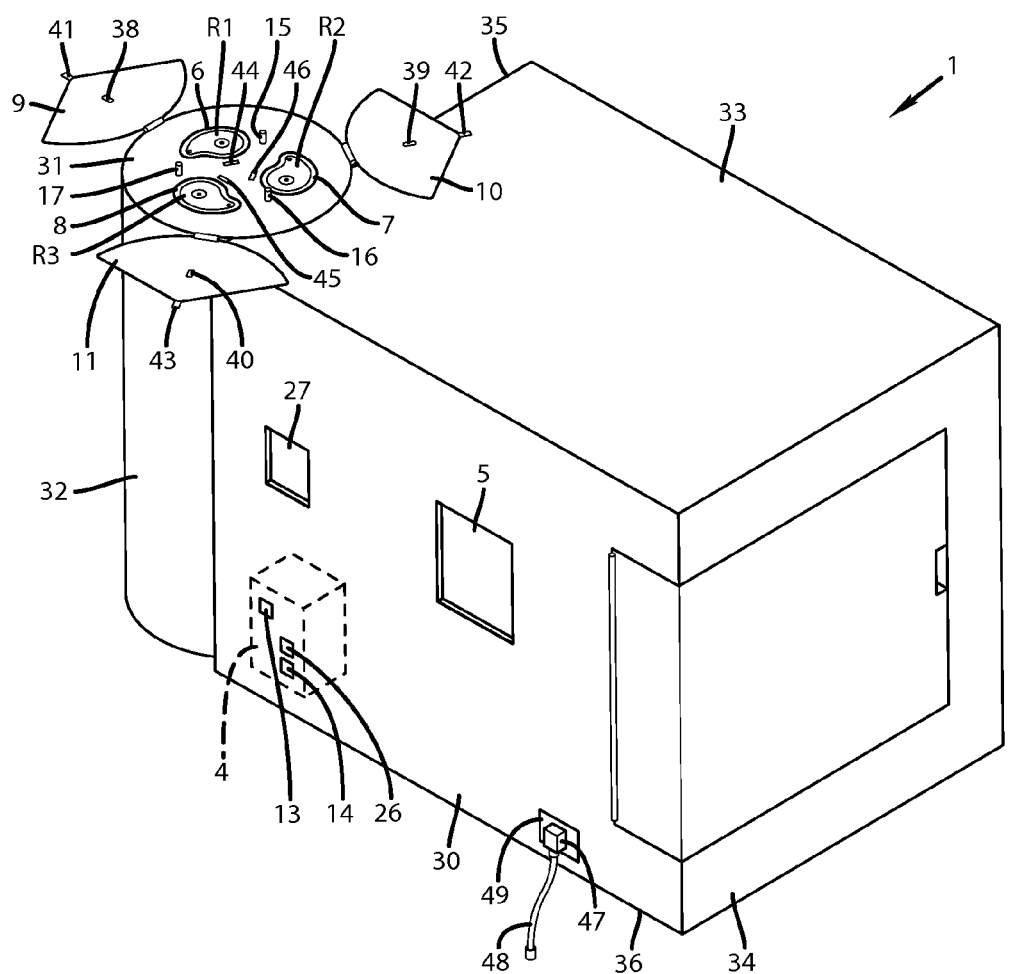
FIG. 1 provides a rear perspective view of an embodiment of a dual camera.

Referring to FIG. 1, a rear view of a dual camera 1 is shown. The camera body of the dual camera 1 includes a rear side wall 30, a bottom side wall 33, a first side wall 34, and a second side wall 35. FIG. 1 provides a camera lens 5, a unit 4, a storage device 13, a controller 26, a light lamp 27, an interface 14, and pins 38, 39, and 40. The controller 26 operates the dual camera 1. The circuitry of the controller 26 connects to the interface 14 and the storage device 13.

FIG. 1 shows a chamber housing 32 which holds housing compartments 6, 7, and 8. The housing compartments 6, 7, and 8 receive the camera film rolls R1, R2, and R3. The dual camera 1 includes a plurality of detachable housing compartment doors 9, 10, and 11. The detachable housing compartment door 9 covers the first housing compartment 6. The detachable housing compartment doors 10 and 11 cover the second housing compartment 7 and the third housing compartment 8 respectively.

FIG. 1 shows clamps 41, 42, and 43 on housing compartment doors 9, 10, and 11. Housing compartment doors 9, 10, and 11 may be manually closed by fastening clamps 41, 42, and 43 to receivers 44, 45, and 46. However, housing compartment doors 9, 10, and 11 also may be operated through the controller 26.

A revolving holder 31 rotates the pins 38, 39, and 40. The dual camera 1 may include housing compartment door sensors 15, 16, and 17 that determine whether the housing compartment doors 9, 10, and 11 respectively are open or closed. The housing compartment door sensors 15, 16, and 17 may communicate information to the interface 14, which is coupled to the controller 26. Then, the controller 26 stores information from the housing compartment door sensors 15, 16, and 17 in the storage device 13.

Figure 9:
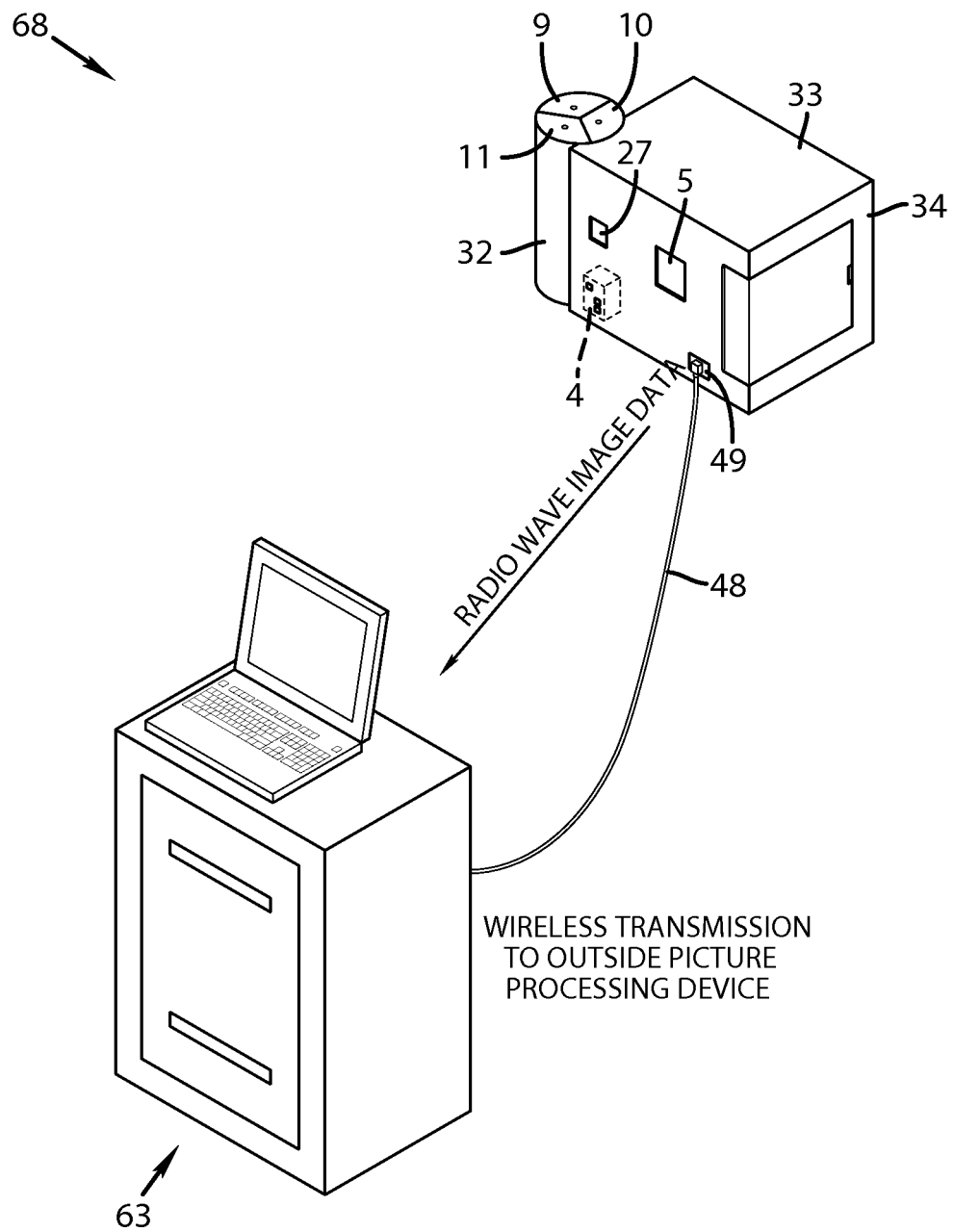
FIG. 9 is a diagram depicting the cable connection between a dual camera and outside picture processing device for transmitting radio wave image data.

FIG. 1 shows a cable connector 47, a cable 48, and a cable port 49. An option is to provide a wired network 68 as shown in FIG. 9. The cable 48 may directly transmit radio wave image data from the dual camera 1 to the outside picture processing device 63 (shown in FIG. 9).

Figure 2:
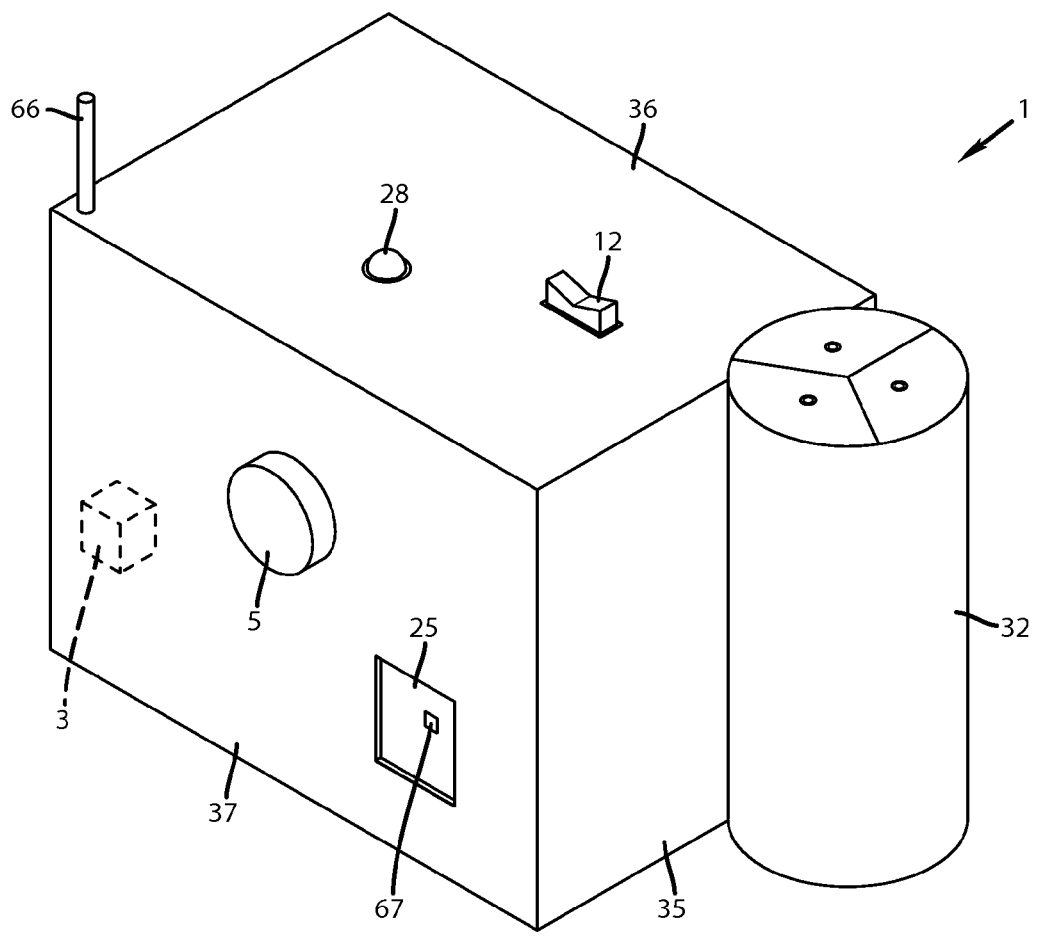
FIG. 2 shows a front perspective view of an embodiment of the dual camera.

A topside view of the dual camera 1 is provided in FIG. 2. FIG. 2 shows a top side wall 36, a front side wall 37, and the second side wall 35 of the camera body. FIG. 2 also shows the chamber housing 32, adjacent to the second side wall 35. FIG. 2 depicts the camera lens 5, mounted on the front side wall 37. As shown in FIG. 2, a shutter button 28 regulates light through a shutter onto a frame of a camera film roll. In accordance with FIG. 2, the dual camera 1 may include a dual camera switch 12. The dual camera switch 12 turns the dual camera 1 to an on mode or an off mode. Of course, it is understood that the dual camera 1 may include a camera switch or button that turns the dual camera 1 to an on mode or an off mode.

As shown in FIG. 2, the dual camera 1 includes a touch screen 25 for command input and display output. Circuitry of the touch screen 25 connects to a photographer interface 67. In turn, the circuitry of the photographer interface 67 connects to the controller 26. In FIG. 2, the circuitry of the controller 26 connects to an antenna 66.

Figure 8:
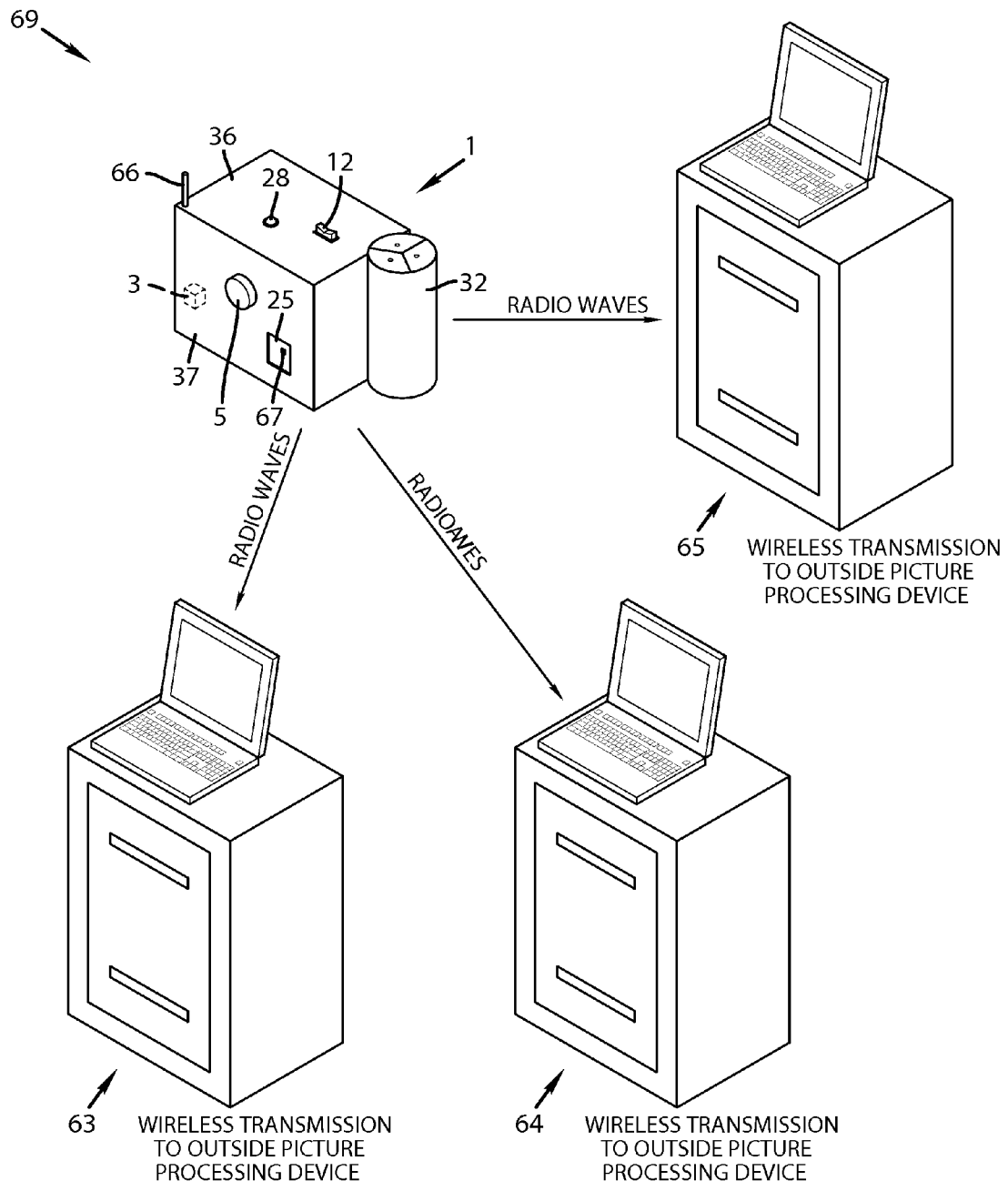
FIG. 8 provides a diagram illustrating a wireless network of radio wave wireless connections between a dual camera and outside picture processing devices.

The dual camera 1 of FIG. 2 includes a radio wave transmission attachment 3 mounted on the front side wall 37. FIG. 8 shows a wireless network 69 including a dual camera 1 and outside picture processing devices 63, 64, and 65. The radio wave transmission attachment 3 may send radio wave image data into the air through radio waves and the radio wave transmission attachment 3 wirelessly transmits image data through radio waves to the selected outside picture processing device 63, 64 and/or 65 (shown in FIG. 8). The radio wave transmission attachment 3 may receive data from the selected outside picture processing device 63, 64 and/or 65 and communicate the data to the interface 14, coupled to the controller 26. The antenna 66 (shown in FIG. 2) may also receive data from the selected outside picture processing device 63, 64 and/or 65.

Figure 3:
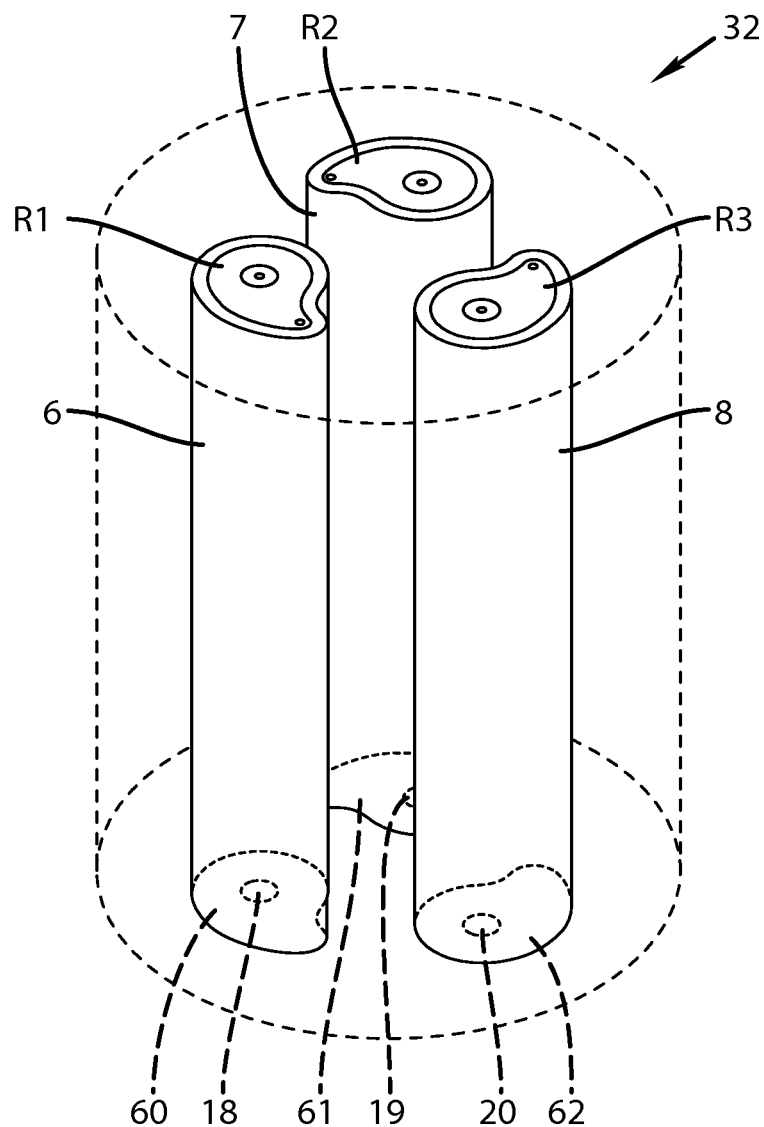
FIG. 3 depicts a topside view of a chamber housing.

FIG. 3 shows the chamber housing 32. FIG. 3 also shows camera film rolls R1, R2, and R3 of housing compartments 6, 7, and 8. The dual camera 1 may include a plurality of sensors 18, 19, and 20 positioned on bottom walls 60, 61, and 62 of the inside of the plurality of housing compartments 6, 7, and 8 as depicted in FIG. 3. The sensors 18, 19, and 20 determine whether camera film rolls R1, R2, and R3 have been placed inside housing compartments 6, 7, and 8 respectively. Likewise, the sensors 18, 19, and 20 determine whether camera film rolls R1, R2, and R3 have been removed from housing compartments 6, 7, and 8.

Figure 4:
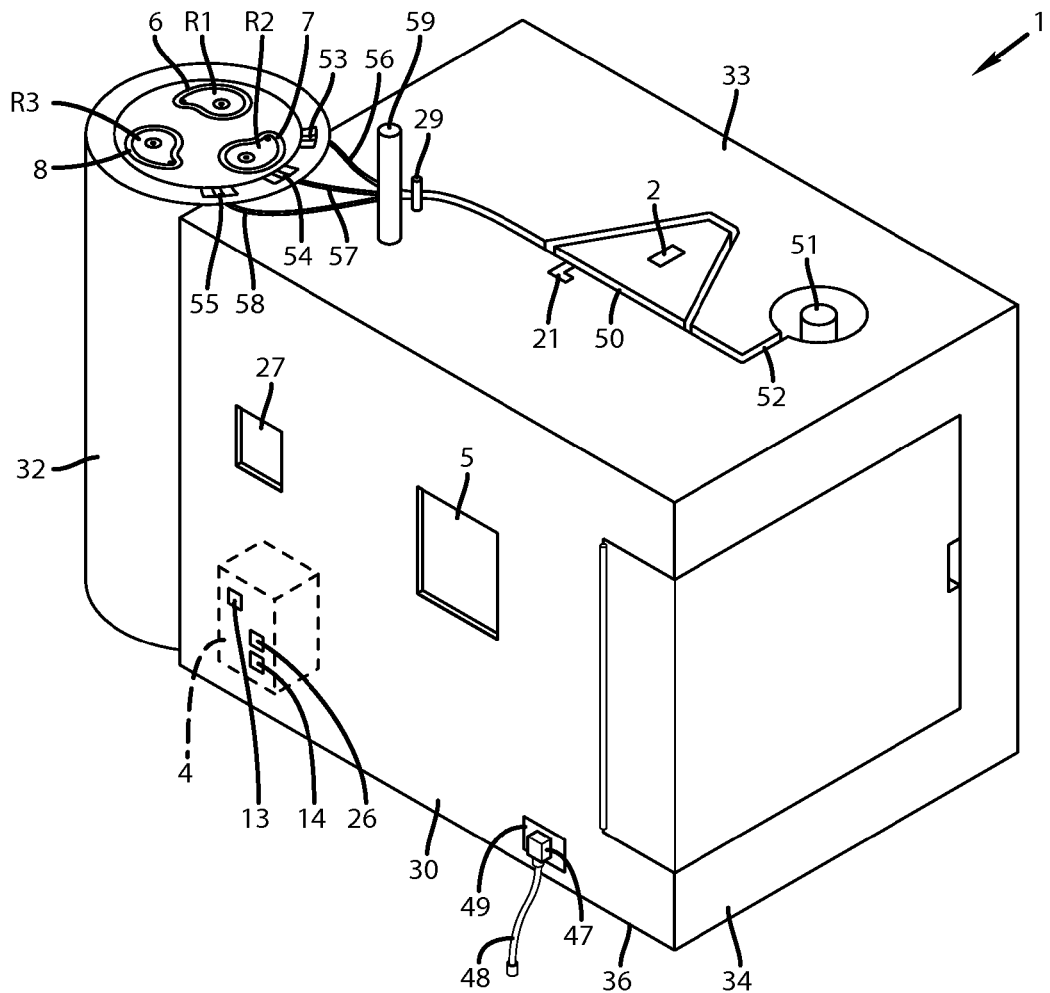
FIG. 4 is a topside view of the dual camera with a cutaway.

FIG. 4 provides a topside view of the dual camera 1 with a cutaway. FIG. 4 shows the controller 26, camera film rolls R1, R2, and R3, and the housing compartments 6, 7, and 8. The sensors 18, 19, and 20 (shown in FIG. 3) may communicate to the interface 14 information regarding whether the camera film rolls R1, R2, and R3 are positioned inside the housing compartments 6, 7, and 8. The controller 26 stores information from the sensors 18, 19, and 20 in the storage device 13 of FIG. 4.

FIG. 4 shows the first side wall 34, the front wall 37, the rear side wall 30, the light lamp 27, and the camera lens 5. FIG. 4 provides apertures 53, 54, and 55. FIG. 4 also provides an image radio wave converter 2, a gate 50, and a central tower 51. Paths 52, 56, 57, 58 are shown in FIG. 4.

As illustrated in FIG. 4, the dual camera 1 may be supplied with an exposure sensor 21 positioned at the gate 50. The exposure sensor 21 determines whether the frame of a camera film roll is exposed or unexposed. The exposure sensor 21 may communicate information to the controller 26 through the interface 14. The controller 26 stores information from the exposure sensor 21 in the storage device 13.

FIG. 4 shows the cable connector 47, the cable 48, and the cable port 49. The image radio wave converter 2 converts photograph images into radio wave image data. Then, the cable 48 may transmit radio wave image data to the outside picture processing device 63 (shown in FIG. 9) or the radio wave transmission attachment 3 may wirelessly transmit image data through radio waves to an outside picture processing device 63 (shown in FIG. 8).

FIG. 4 shows a film guide 29 and an enclosed chamber 59. The camera central tower 51 selectively moves the camera film rolls R1, R2, and R3 into a non-filming position. The camera central tower 51 may also selectively move the camera film rolls R1, R2, and R3 into a filming position. The film guide 29 moves forward film of the camera film rolls R1, R2, and R3 from housing compartments 6, 7, and 8. The film guide 29 reversely moves the film of the camera film rolls R1, R2, and R3 to housing compartments 6, 7, and 8.

Figure 5:
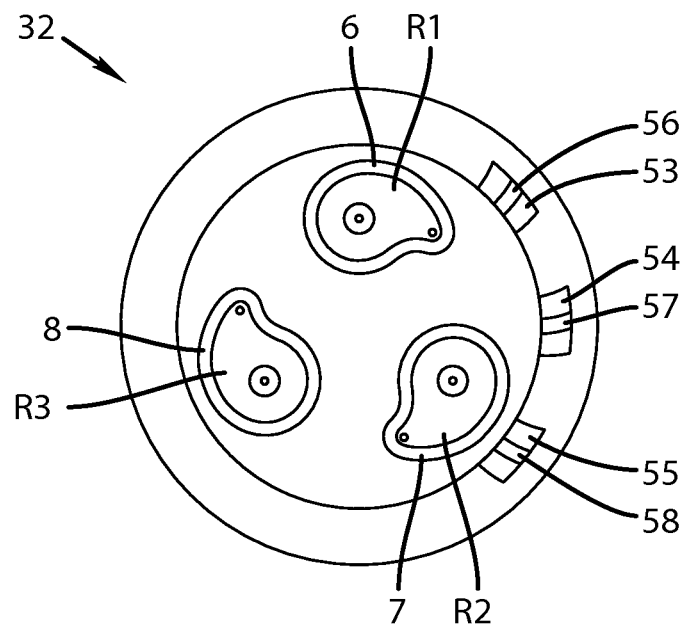
FIG. 5 illustrates a plan view of a chamber housing with a cutaway.

FIG. 5 shows the housing chamber 32. FIG. 5 shows camera film rolls R1, R2, and R3. FIG. 5 depicts three apertures 53, 54, and 55 through which camera film rolls R1, R2, and R3 may pass. FIG. 5 shows housing compartments 6, 7, and 8. FIG. 5 shows the paths 56, 57, and 58 through which camera film rolls R1, R2, and R3 may advance.

Figure 6:
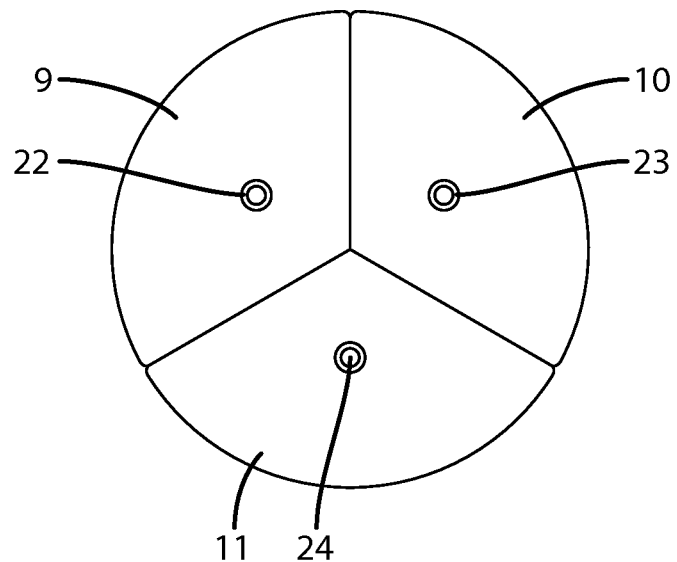
FIG. 6 serves as a plan view of a plurality of housing compartments.

Buttons 22, 23, and 24 may be provided as shown in FIG. 6 to open housing compartment doors 9, 10, and 11. The button 22 may open a selected housing compartment door 9 while the camera film roll R1 in the housing compartment 6 is in a non-filming position. The button 23 is operable to select housing compartment door 10 when the camera film roll R2 in the housing compartment 7 is in a non-filming position. If the camera film roll R3 in the housing compartment 8 is in a non-filming position, then the button 24 may open a selected housing compartment door 11. Alternatively, commands to open or close housing compartment doors 9, 10, and 11 may be input into the touch screen 25 and the controller 26 may command the opening or closing of housing compartment doors 9, 10, and 11.

Figure 7A:
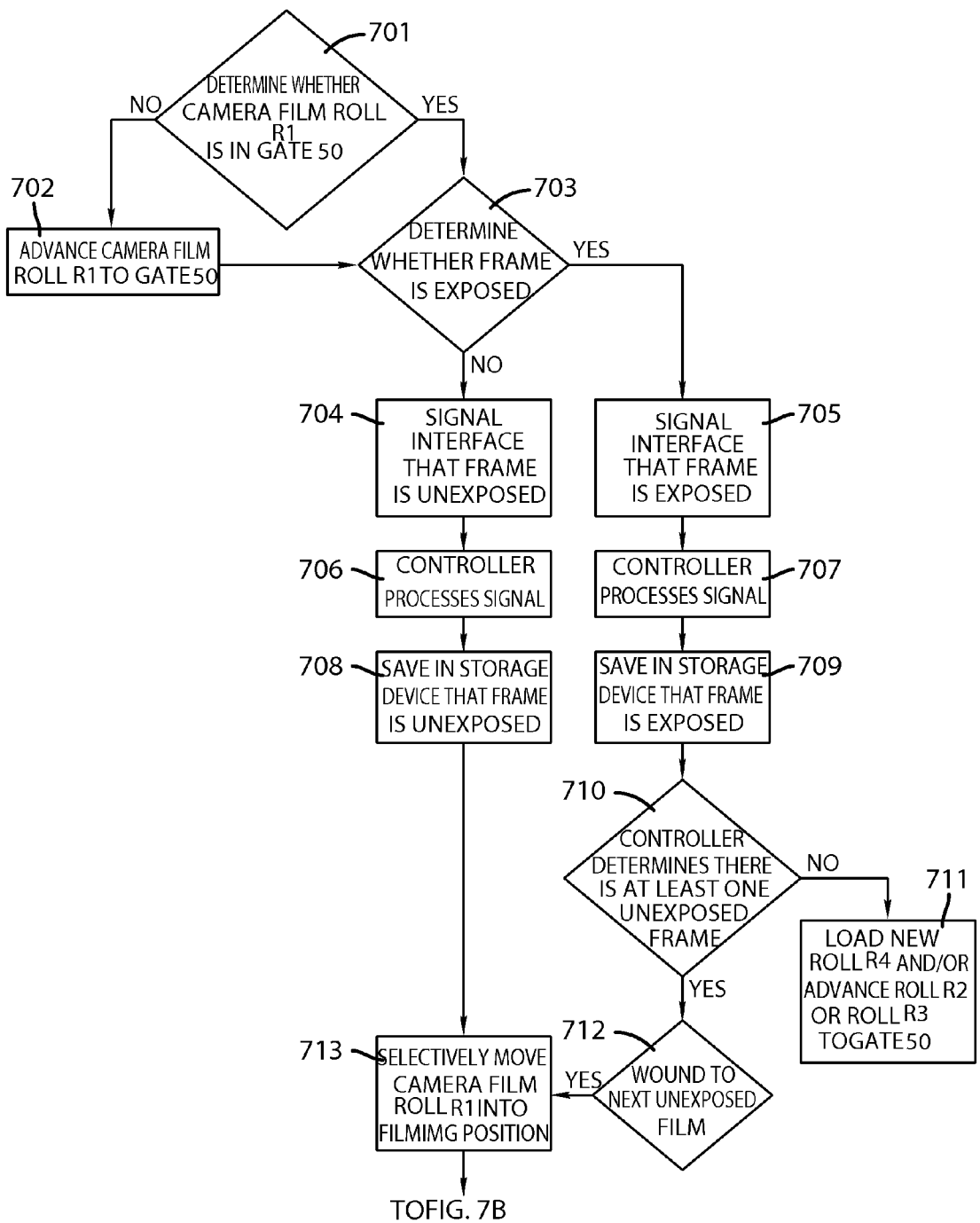
FIG. 7A is a first part of a flow chart of a method for continuous wireless transmission of image data through radio waves to an outside picture processing device and continuous capture of images on frames of camera film rolls.
Figure 7B:
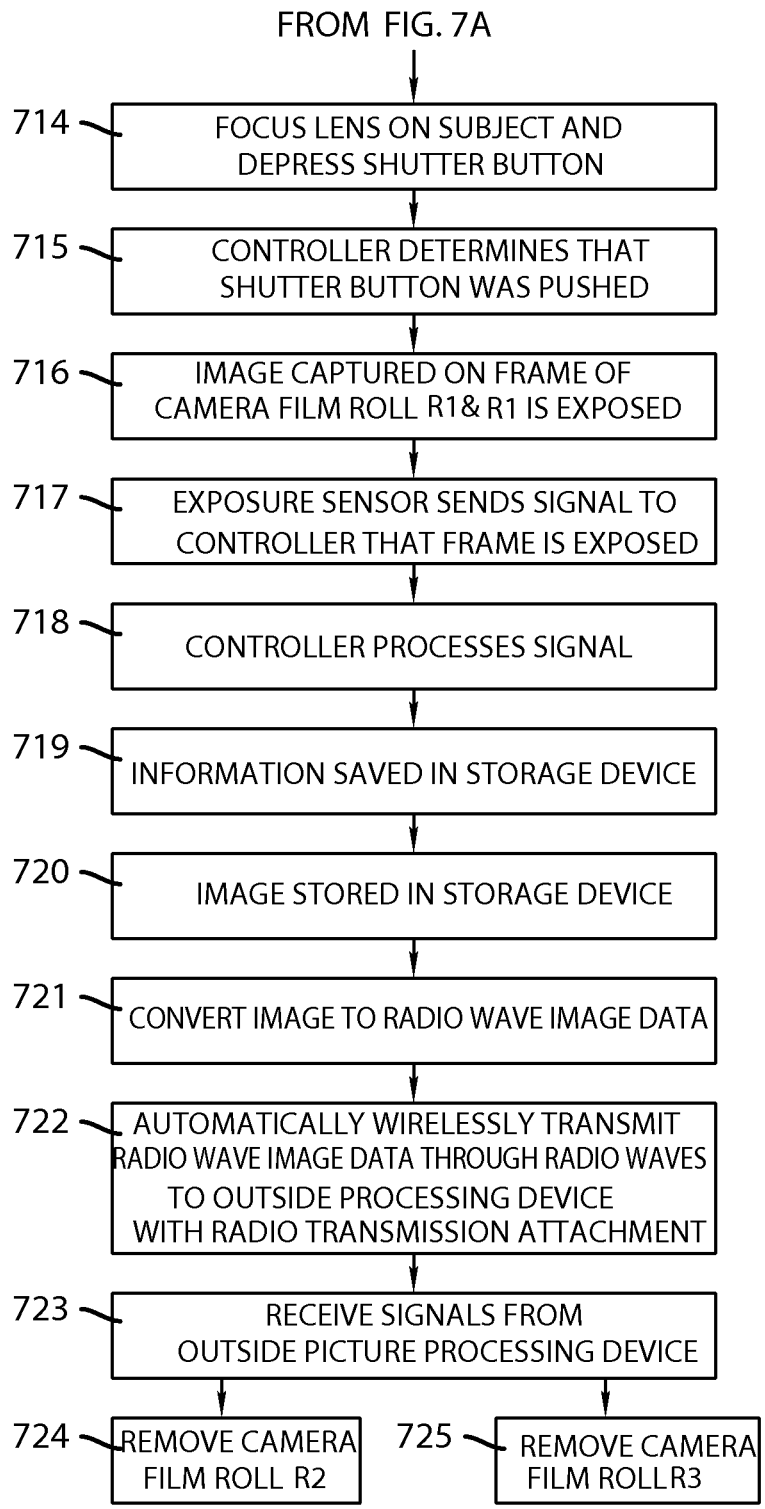
FIG. 7B is a second part of the flow chart of a method for continuous wireless transmission of image data through radio waves to an outside picture processing device and continuous capture of images on frames of camera film rolls.

FIGS. 7A-7B illustrates a flow chart of the method of wirelessly transmitting image data through radio waves to an outside picture processing device 63 and continuously capturing images on frames of the camera film rolls. The exposure sensor 21 of the dual camera 1 determines whether the camera film roll R1 is in the gate 50 (step 701). If the camera film roll R1 is not in the gate 50, then, the film guide 29 may advance the camera film roll R1 into the gate 50 (step 702). However, if the camera film roll R1 is in the gate 50, then the exposure sensor 21 determines whether the frame of the camera film roll R1 is exposed or unexposed (step 703).

After the exposure sensor 21 determines whether the frame of the camera film roll R1 is exposed or unexposed (step 703), the exposure sensor 21 communicates with the interface 14 of the controller 26 by sending a signal to the interface 14 (steps 704, 705). For example, in step 704, the exposure sensor 21 communicates with the interface 14 by providing a signal to the interface 14 that the frame of the camera film roll R1 is unexposed. Under such circumstances, the controller 26 may proceed from step 704 to step 706. In an alternative situation where the camera film roll R1 is exposed, the exposure sensor 21 communicates with the interface 14 by conveying a signal to the interface 14 that the frame of the camera film roll R1 is exposed (step 705). From step 705, the controller 26 may proceed to step 707.

The controller 26 processes the signal regarding exposure frame information (steps 706, 707) and stores the exposure frame information in the storage device 13 (steps 708, 709). As shown in FIG. 7, the controller 26 processes the signal that indicates the frame of the camera film roll R1 is unexposed (step 706). In step 708, the controller 26 commands the storage device 13 to store the exposure frame information regarding the unexposed frame in the storage device 13. If the exposure sensor 21 conveys the signal that the frame of the camera film roll R1 is exposed, then the controller 26 processes the signal (step 707) and the controller 26 proceeds to step 709. In step 709, the controller 26 stores the information regarding the exposed frame of the camera film roll R1 in the storage device 13.

In the situation where the unexposed frame of the camera film roll R1 is in the gate 50, the controller 26 may proceed to step 713. According to step 713, the camera film roll R1 may be selectively moved into a filming position by the filming guide 29. Then, the camera lens 5 may be focused on the subject and the shutter button 28 may be depressed (step 714). The controller 26 of the dual camera 1 may determine whether the shutter button 28 has been depressed and a flash may be produced by the light lamp 27 (step 715). An image is captured on the frame of the camera film roll R1 (step 716), exposing the frame of the camera film roll R1.

When the image is captured on the frame of the camera film roll R1 and the frame of the camera film roll R1 is exposed, the exposure sensor 21 sends a signal to the interface 14 of the controller 26 that the frame of the camera film roll R1 has been exposed (step 717). Next, the controller 26 processes the signal (step 718). The controller 26 stores information regarding the exposure of the frame in the storage device 13 (step 719).

The image is stored in the storage device 13 (step 720). The image radio wave converter 2 converts the image into radio wave image data (step 721). The radio wave transmission attachment 3 automatically wirelessly transmits the radio wave image data to the selected outside picture processing device 63 using radio waves (step 722). The radio wave transmission attachment 3 is operable to automatically wirelessly transmit the radio wave image data to a plurality of outside picture processing devices 63, 64, and 65 using radio waves. The radio wave transmission attachment 3 may receive signals from the outside picture processing device 63 (step 723).

As discussed above, in step 709, the exposure frame information regarding the exposed frame is stored in the storage device 13. If the controller 26 determines that all frames of the camera film roll R1 are exposed (step 710), then a new camera film roll R4 may be loaded and advanced to the gate 50 (step 711). If the controller 26 determines that there is at least one unexposed frame in the camera film roll R1 (step 710), the controller 26 may command the film guide 29 to selectively move the camera film roll R1 to a filming position (step 712). Then, the controller 26 may proceed to steps 713 through 723.

During the photographing of images using the camera film roll R1 and continuously transmitting of radio wave image data to the outside picture processing device 63, the detachable housing compartment door 10 may be operable to simultaneously remove the camera film roll R2 in the non-filming position when all of the frames of the camera film roll R2 are fully exposed, without exposing the camera film roll R1 in filming position (step 724). While photographing of images using the camera film roll R1 and continuously transmitting radio wave image data to the outside picture processing device 63, the detachable housing compartment door 11 may also be operable to simultaneously remove the camera film roll R3 in the non-filming position when all of the frames of the camera film roll R3 are fully exposed, without exposing the camera film roll R1 in filming position (step 725).

Figure 7C:
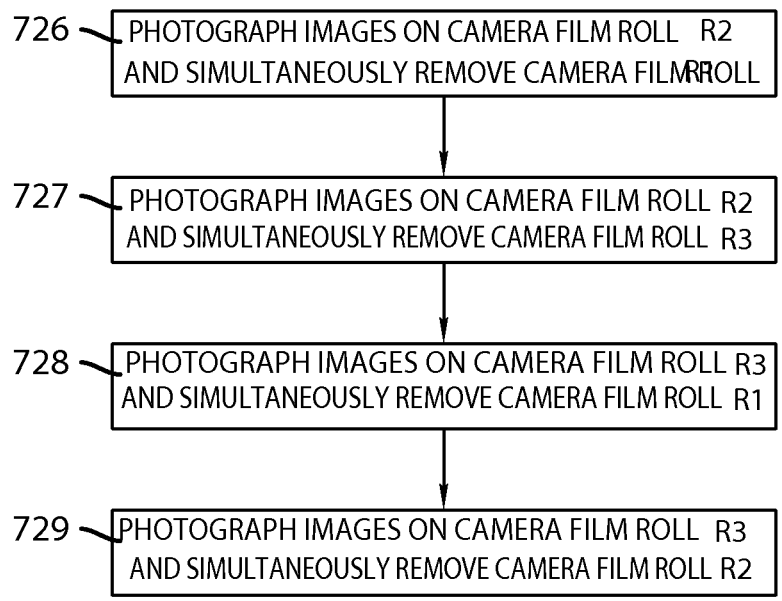
FIG. 7C shows a flow chart regarding photographing images and simultaneously removing camera film rolls.

Alternatively, as shown in FIG. 7C, if a user is photographing images using the camera film roll R2 and transmitting radio wave image data to an outside picture processing device 63, the detachable housing compartment door 9 may be operable to simultaneously remove the camera film roll R1 in the non-filming position when all of the frames of the camera film roll R1 are fully exposed (step 726). In step 726, the camera film roll R2, located in filming position, is not exposed. Further, during the photographing of images using the camera film roll R2 and transmitting of radio wave image data to an outside picture processing device 63, the detachable housing compartment door 11 may be operable to simultaneously remove the camera film roll R3 in the non-filming position when all of the frames of the camera film roll R3 are fully exposed (step 727). Again, the camera film roll R2, located in filming position, is not exposed.

If the user is using the camera film roll R3 to photograph a subject (as shown in FIG. 7B), the detachable housing compartment door 9 may be operable to simultaneously remove the camera film roll R1 in the non-filming position when all of the frames of the camera film roll R1 are fully exposed (step 728). Analogous to steps 726 and 727, the camera film roll R3, located in filming position, is not exposed during step 728. In step 729, the detachable housing compartment door 10 may be operable to simultaneously remove the camera film roll R2 in the non-filming position when all of the frames of the camera film roll R2 are fully exposed, without exposing the camera film roll R3 in filming position.

Another method may include transmitting image data through radio waves to an outside picture processing device 63 and continuous capture of images on frames of the camera film rolls. The dual camera switch 12 turns on the dual camera 1. The sensor 18 of the dual camera 1 determines whether the housing compartment 6 contains the camera film roll R1. The sensor 18 sends a signal to the interface 14, indicating whether the camera film roll R1 is positioned inside the housing compartment 6. The controller 26 processes the information from the sensor 18 and stores the information in the storage device 13. Immediately, the touch screen 25 may display whether the camera film roll R1 is positioned in the housing compartment 6. If the housing compartment 6 does not contain the camera film roll R1, then the controller 26 will proceed to the next. Nevertheless, if the housing compartment 6 contains the camera film roll R1, then the controller 26 determines whether all of the frames in the camera film roll R1 are exposed based on information stored in the storage device 13.

Subsequent to the controller 26 determining whether all the frames in the camera film roll R1 are exposed, the exposure sensor 21 determines whether the camera film roll R1 is in the gate 50. The user may push the button 22 to remove camera film roll R1 if the camera film roll R1 is not in the gate 50 and all frames of the camera film roll R1 are exposed.

After depressing the button 22, the user may open housing compartment door 9. When the user opens housing compartment door 9, the compartment door sensor 15 communicates a signal to the interface 14 of the controller 26 that housing compartment door 9 is open. The controller 26 processes the signal from the housing compartment door sensor 15 and stores information from the housing compartment door sensor 15 in the storage device 13.

The camera film roll R1 may be removed from the housing compartment 6. A new camera film roll R4 may be inserted into the housing compartment 6. Then, the housing compartment door 9 may be closed. In turn, the compartment door sensor 15 may communicate a signal to interface 14 that the housing compartment door 9 is closed. The controller 26 processes the signal from the housing compartment door sensor 15 and stores information from the housing compartment door sensor 15 in the storage device 13.

Once the new camera film roll R4 is placed inside the housing compartment 6, the sensor 18 detects that the housing compartment 6 contains the camera film roll R4. Thus, the sensor 18 sends a signal to the interface 14 of the controller 26 indicating that a camera film roll R4 has been placed inside the housing compartment 6. The controller 26 processes the information from the sensor 18 and stores the information in the storage device 13. The touch screen 25 displays that the housing compartment 6 is loaded.

The exposure sensor 21 of the dual camera 1 may determine whether the camera film roll R1 is located inside the gate 50. If the camera film roll R1 is not located inside the gate 50, then the film guide 29 may advance the camera film roll R1 into the gate 50. The controller 26 may command the film guide 29 to selectively move the camera film roll R1 to a filming position. The film guide 29 may wind the camera film roll R1 to the first unexposed frame.

The user may adjust the camera lens 5 to focus on an object. The controller 26 may determine whether the shutter button 28 has been pushed. Capturing the image on the frame of the camera film roll R1 exposes the frame of the camera film roll R1. Thus, the exposure sensor 21 sends a signal to the controller 26 that the frame of the camera film roll R1 has been exposed. The controller 26 processes the signal and stores the information in the storage device 13. The controller 26 stores the image in the storage device 13. At the same time, the image radio wave converter 2 converts the image into radio wave image data. The radio wave transmission attachment 3 automatically wirelessly transmits the image data to the outside picture processing device 63 using radio waves.

If the sensor 18 determines that the housing compartment 6 does not contain the camera film roll R1, then the sensor 18 will send a signal to the controller 26 and the storage device 13 will store the information processed by the controller 26. The button 22 may be depressed where the sensor 18 determines that the housing compartment 6 does not contain the camera film roll R1. The housing compartment door 9 may be opened.

If the camera film roll R1 is in the gate 50, then the controller 26 will determine whether all the frames of the camera film roll R1 are exposed. If the controller 26 determines that all of the frames of the camera film roll R1 are exposed, then the camera film roll R1 will be wound into housing compartment 6. Optionally, if the controller 26 determines that the frames of the camera film roll R1 in gate 50 are unexposed, the controller 26 may command the film guide 29 to selectively move the camera film roll R1 to a filming position. The camera film roll R1 may be wound to the next unexposed frame.

The camera lens 5 may be adjusted and focused on the subject to be photographed. The dual camera 1 may determine whether the shutter button 28 has been pushed. The image is captured on the frame of the camera film roll R1 and the frame of the camera film roll R1 is exposed. A signal, conveying the exposure of the frame, is sent from the exposure sensor 21 to the interface 14, coupled to the controller 26. The controller 26 processes the signal. The information regarding the exposed frame is stored in the storage device 13. The image is stored in the storage device 13. At the same time, image radio wave converter 2 converts the image into radio wave image data. The radio wave transmission attachment 3 automatically wirelessly transmits the image data to the outside picture processing device 63 using radio waves.

During the method, any of the steps may simultaneously be performed. It is contemplated that during the steps of the method, images may be similarly simultaneously captured on the frames of the camera film roll R3 and radio wave image data may be wirelessly transmitted through radio waves with a radio wave transmission attachment 3 to an outside picture processing device 63 or transmitted through a cable 48 to an outside picture processing device 63 if camera film roll R3 is in the filming position.

The sensor 19 determines whether the camera film roll R2 is positioned in the housing compartment 7. The sensor 19 relays a signal to the interface 14 that the camera film roll R2 is positioned in the housing compartment 7. After processing the signal, the controller 26 saves the relevant information in the storage device 13. The user may view the touch screen 25 showing that the camera film roll R2 is positioned in the housing compartment 7. In the event that the housing compartment 7 is empty, the controller 26 may proceed.

If the camera film roll R2 is in the housing compartment 7, then the controller 26 determines whether all of the frames in the camera film roll R2 are exposed. The controller 26 analyzes the information stored in the storage device 13 to determine whether all of the frames in the camera film roll R2 are exposed. In addition, the exposure sensor 21 determines whether the camera film roll R2 is in the gate 50.

If all the frames in the camera film roll R2 are exposed and the camera film roll R2 is not in the gate 50, the button 23 may be pushed to open the housing compartment door 10 and the camera film roll R2 may be removed. The camera film roll R2 may be replaced with a new camera film roll R5. Once the new camera film roll R5 has been inserted, the housing compartment door 10 may be closed in step 861.

The compartment door sensor 16 communicates a signal to the interface 14, coupled to the controller 26. The signal indicates that the housing compartment door 10 is closed. The controller 26 processes the signal that the housing compartment door 10 is closed. The controller 26 stores information from the housing compartment door sensor 16 in the storage device 13.

The sensor 19 may determine that the new camera film roll R5 is positioned in the housing compartment 7. The sensor 19 may dispatch a signal to the interface 14 that the camera film roll R5 is positioned in the housing compartment 7. The controller 26 may process the signal. The storage device 13 may store information regarding the position of the camera film roll R5 in housing compartment 7. A message, displayed on the touch screen 25, may indicate that housing compartment 7 is loaded with the camera film roll R5.

If the controller 26 determines that frames in the camera film roll R2 remain unexposed, then this information is stored in the storage device 13 of the dual camera 1. If the camera film roll R2 is not in the gate 50, then the camera film roll R2 may be advanced into the gate 50. The controller 26 may command the film guide 29 to selectively move the camera film roll R2 into the film position. The camera film roll R2 may be wound to the first unexposed frame. The user may focus the camera lens 5 on the subject. The dual camera 1 determines whether the shutter button 28 has been depressed. As the image is captured on the frame of the camera film roll R2, the frame of the camera film roll R2 is exposed.

The exposure sensor 21 conveys a signal to the controller 26 that the frame of the camera film roll R2 has been exposed. The controller 26 processes the signal. The storage device 13 stores information regarding the processed signal. The storage device 13 also stores the image. At the same time, the image radio wave converter 2 converts the image into radio wave image data. The radio wave transmission attachment 3 automatically wirelessly transmits the image data to the outside picture processing device 63 using radio waves.

In a situation where the housing compartment 7 does not contain the camera film roll R2, the sensor 19 sends a signal to the controller 26. The signal indicates that the housing compartment 7 does not contain the camera film roll R2. This signal may be processed by the controller 26 and stored in the storage device 13. The button 23 may be pushed. Then, the controller 26 opens the housing compartment door 10. A new camera film roll R5 may be inserted into the housing compartment 7. Then, the housing compartment door 10 may be closed.

The compartment door sensor 16 communicates a signal to the interface 14, coupled to the controller 26. The signal indicates that the housing compartment door 10 is closed. The controller 26 processes the signal that the housing compartment door 10 is closed. The controller 26 stores information from the housing compartment door sensor 16 in the storage device 13.

The sensor 19 may send a signal to the interface 14 of the controller 26 that the camera film roll R5 is positioned in the housing compartment 7. The controller 26 may process the signal. The storage device 13 may store information regarding the position of the camera film roll R5 in housing compartment 7. The touch screen 25 may display that housing compartment 7 is loaded.

In a situation where the camera film roll R2 is in the gate 50, the exposure sensor 21 may determine whether all the frames of the camera film roll R2 are exposed. If all of the frames of the camera film roll R2 are exposed, then the camera film roll R2 will be positioned in housing compartment 7. However, the camera film roll R2 may be wound to the next unexposed frame should the exposure sensor 21 determine that at least one frame of the camera film roll R2 in gate 50 is unexposed. Similar steps may be followed regarding camera film roll 3.

What is claimed is:

1. A method for continuous wireless transmission of image data through radio waves to an outside picture processing device and continuous capture of images on frames of camera film rolls, said method comprising the steps of:
    providing a camera body;
    providing an image radio wave converter;
    providing a radio wave transmission attachment mounted on said camera body for transmitting image data though radio waves to outside picture processing device;
    providing a camera lens mounted on said camera body for capturing images on frames of camera film rolls;
    providing a plurality of housing compartments for receiving camera film rolls;
    providing a plurality of detachable housing compartment doors operable for simultaneous removal of at least one camera film roll in a non-filming position when images are captured on all frames of the at least one camera film roll, without exposing remaining camera film roll in filming position;
    providing a camera central tower for selectively moving camera film rolls into non-filming position or filming position; and
    providing a button for selectively opening at least one housing compartment door covering at least one housing compartment wherein the camera film roll is in a non-filming position and said button is operable during continuous wireless transmission of images through radio waves to outside picture processing device and operable during continuous capture of images on frames of camera film rolls.

2. The method of claim 1, further comprising the steps of: providing a gate located in said camera body; and providing an exposure sensor positioned at said gate for determining whether frames of camera film rolls are exposed or unexposed.

3. The method of claim 1, further comprising the step of providing a touch screen for command input and display output.

4. The method of claim 1, further comprising the step of providing a shutter button for regulating light through a shutter onto frames of camera film rolls.

5. The method of claim 1, further comprising the step of providing a controller for operating said dual camera through command input from said touch screen.

6. The method of claim 1, further comprising the step of providing a film guide for forwardly moving film of camera film rolls from said plurality of housing compartments and reversely moving film of camera film rolls to said plurality of housing compartments.

7. The method of claim 1, further comprising the step of providing a plurality of sensors located in said plurality of housing compartments for determining whether said plurality of housing compartments are empty.

* * * * *